Figures 1, 2:
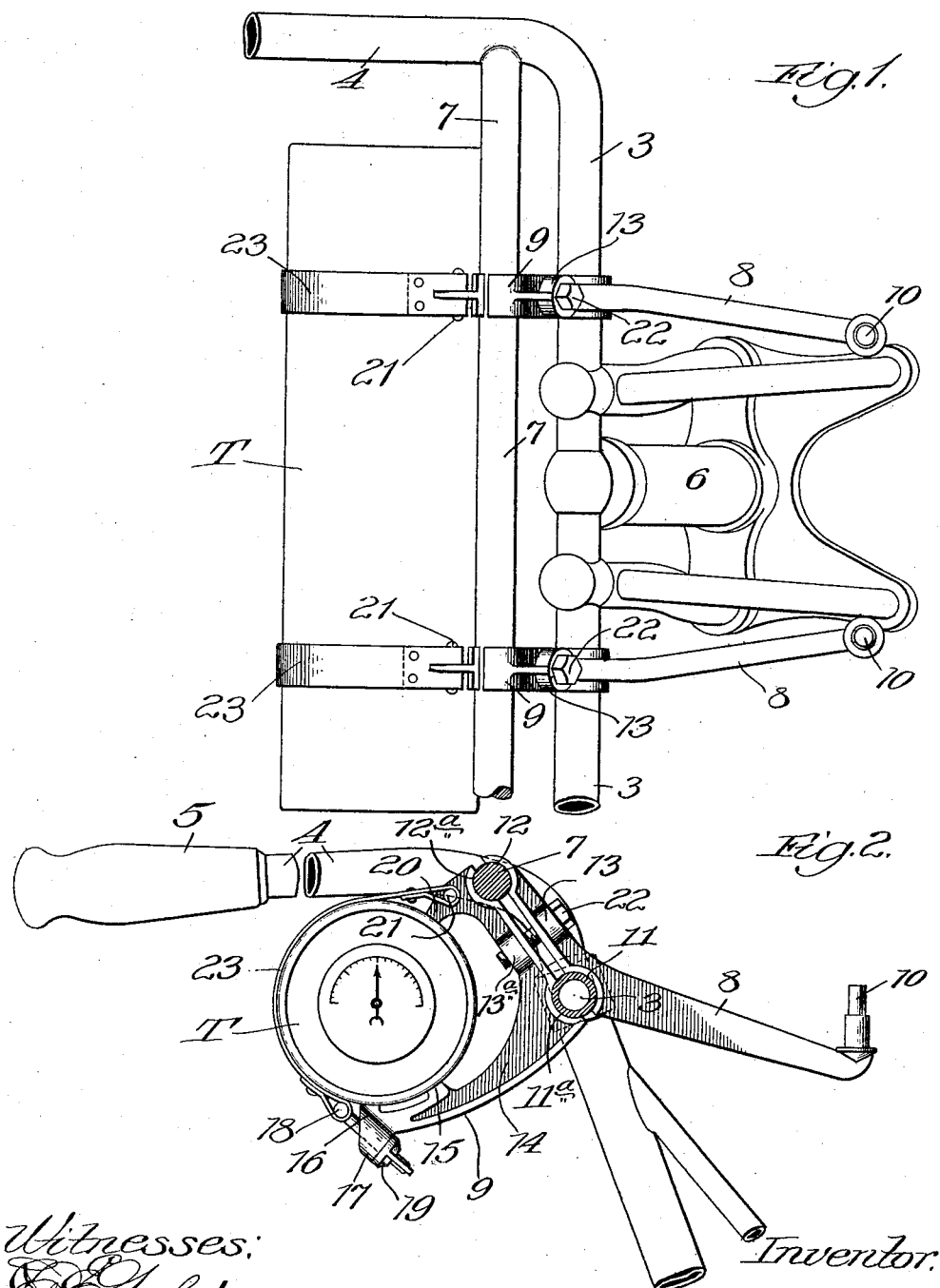

I. SCHWINN.
BRACKET.
APPLICATION FILED JAN. 2, 1914.

1,111,503.

Patented Sept. 22, 1914.

Witnesses:

Inventor:
Ignaz Schwinn,
By Dyrenforth, Lee, Chritton & Wiles,
Attys.

UNITED STATES PATENT OFFICE.

IGNAZ SCHWINN, OF CHICAGO, ILLINOIS.

BRACKET.

1,111,503. Specification of Letters Patent. Patented Sept. 22, 1914.

Application filed January 2, 1914. Serial No. 809,960.

*To all whom it may concern:*

Be it known that I, IGNAZ SCHWINN, a citizen of the United States, residing at Chicago, in the county of Cook and State of Illinois, have invented a new and useful Improvement in Brackets, of which the following is a specification.

The object of my invention is to provide a combination bracket of a construction which shall adapt it to be used on the handle-bars of a motorcycle for supporting in mutually-balancing relation thereon and in desirable close proximity to each other the signal-lamp and the tank containing the fuel for feeding the lamp such as that commonly known in the practical art as the "Prestolite" tank.

In the accompanying drawing, Figure 1 is a broken plan view of the reinforced handle bars of a motorcycle, showing my improved combination-bracket thereon, and Fig. 2 is a broken view showing the same in end elevation.

The handle-bars are formed of the usual transverse tubular member 3 fastened to a steering-head 6 and having legs 4 on its opposite ends carrying the handles 5. The legs, near their junction with the member 3, are rigidly connected together, to reinforce them, by a bar 7.

My improved metal bracket comprises two similar forward members 8, 8 and two similar rear members 9, 9. Each member 8 is of the angular shape shown and these members terminate at their forward ends in upright posts 10, upon which to seat a lamp (not shown) at its supporting sockets. In the knee or angle of each member 8 is formed a semi-cylindrical recess 11 to fit against and embrace the handle-bar member 3, and in the opposite end is formed a similar recess 12 to fit against and embrace the reinforcing-bar 7; and between the two recesses is provided a boss 13 containing a bolt-hole. Each of the two bracket-members 9 is formed with a straight face-section terminating at one end in a semi-cylindrical recess 11ª, to fit against and embrace the handle-bar member 3 coincidently with the recess 11, and at its opposite end in a semi-cylindrical recess 12ª to fit against and embrace the reinforcing-bar 7 coincidently with the recess 12. Between these two recesses is provided a boss 13ª containing a bolt-hole to register with that in the boss 13 when the bracket is fastened in place. A lower curved, webbed arm 14 extends backwardly from the straight-faced section and is provided with two lugs 15 and 16, respectively near and at its end, for seating a cylindrical tank T in horizontal position on the bracket when in place, and under the lug 16 is formed a hollow head 17 to receive the threaded stem of a hook 18, on the end of which works a thumb-nut 19. A lug 20 projects backwardly from the upper end of each member 9 and carries a stud 21.

To apply my improved bracket, the members 8 are applied at their recesses 11 and 12 respectively to the front sides of the handle-bar member 3 and reinforcing bar 7, and the members 9 are similarly applied to the rear sides of the same, and the members 8 and 9 of each pair are fastened together by a bolt 22 passed through them at the bosses 13 and 13ª, whereby they are rigidly fastened together.

With the bracket thus applied, a lamp may be stably seated on the studs 10 threading said studs through the supporting eyes or sockets usually provided on the lamp for this purpose. To support a tank T, it bears against the lugs 15, 16 and 20, and is removably held in place by metal straps 23, each looped at one end for attachment to a stud 21, and at its opposite end to be engaged by a hook 18; and by turning the nuts 19 the bands are tightened to firmly fasten the tank in place.

By the use of my improved combination-bracket, the forward and rear members coöperate to hold, respectively, the lamp and tank in counterbalancing relation to each other, with the tank in desirable close proximity to the lamp, whereby the course of flow of fuel to the lamp is reduced to the minimum length; and, moreover, the tank is caused to occupy an ideal position, where it is out of the way of obstructing access to other parts of the motorcycle and is practically hidden and protected from injury.

What I claim as new and desire to secure by Letters Patent is:—

1. A device for use with motorcycle handle-bars having a reinforcing bar extending between the legs, comprising a lamp and tank supporting bracket including a pair of angular forward members provided with lamp-supports and lower and upper recesses fitting, respectively, against the transverse handle-bar member and the reinforcing bar, and a pair of rear members having lower and upper recesses fitting oppositely to said forward members respectively against said transverse member and the reinforcing bar, said forward and rear members being rigidly bolted together between their ends and the rear members forming a tank-support, and means on the rear bracket-members for securing a tank in place thereon.

2. A device for use with motorcycle handle-bars having a reinforcing bar extending between the legs, comprising a lamp and tank supporting bracket including a pair of angular forward members provided with lamp-socket posts on their advance-ends and lower and upper recesses fitting, respectively, against the transverse handle-bar member and the reinforcing bar, and a pair of rear members having straight-faced sections provided with lower and upper recesses fitting oppositely to said forward members respectively against said transverse member and the reinforcing bar, curved rearwardly-extending lower arms provided with tank-seating lugs, upper rearwardly-projecting lugs on said rear members, said forward and rear members being rigidly bolted together between said recesses, and means on the rear bracket-members for securing a tank in place thereon.

IGNAZ SCHWINN.

In presence of—
  A. C. FISCHER,
  F. A. FLORELL.

---

Copies of this patent may be obtained for five cents each, by addressing the "Commissioner of Patents, Washington, D. C."